United States Patent
Alam et al.

(10) Patent No.: US 10,382,305 B2
(45) Date of Patent: *Aug. 13, 2019

(54) APPLYING SEQUENCED INSTRUCTIONS TO CONNECT THROUGH CAPTIVE PORTALS

(71) Applicant: Microsoft Technology Licensing, LLC, Redmond, WA (US)

(72) Inventors: Mohammad Shabbir Alam, Redmond, WA (US); Javier Flores Assad, Bothell, WA (US); Nicholas A. Banks, Duvall, WA (US); Piyush Goyal, Redmond, WA (US); James Christopher Gray, Redmond, WA (US); Shai Guday, Redmond, WA (US); Thomas W. Kuehnel, Seattle, WA (US); Triptpal Singh Lamba, Bothell, WA (US); David Neil MacDonald, Seattle, WA (US); Darya Mazandarany, Kirkland, WA (US); Sidharth Uday Nabar, Seattle, WA (US); Christopher R. Rice, Redmond, WA (US); Saumaya Sharma, Seattle, WA (US); Douglas E. Stamper, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 298 days.

This patent is subject to a terminal disclaimer.

(21) Appl. No.: 14/081,202

(22) Filed: Nov. 15, 2013

(65) Prior Publication Data
US 2015/0142946 A1 May 21, 2015

(51) Int. Cl.
*G06F 15/173* (2006.01)
*H04L 12/26* (2006.01)
(Continued)

(52) U.S. Cl.
CPC ......... *H04L 43/0876* (2013.01); *H04W 12/08* (2013.01); *H04W 36/36* (2013.01); *H04L 63/102* (2013.01); *H04W 84/12* (2013.01)

(58) Field of Classification Search
CPC ....... H04L 9/083; H04L 9/321; H04L 9/3271; H04L 63/30; H04L 63/083;
(Continued)

(56) References Cited

U.S. PATENT DOCUMENTS 6,243,754 B1  6/2001  Guerin et al.
6,493,547 B1  12/2002  Raith
(Continued)

FOREIGN PATENT DOCUMENTS

CA  2775804 A1  7/2012
CN  1403952 A   3/2003
(Continued)

OTHER PUBLICATIONS

"The Future of Hotspots: Making Wi-Fi as Secure and Easy to Use as Cellular", Retrieved at <<http://www.cisco.com/en/US/solutions/collateral/ns341/ns524/ns673/white_paper_c11-649337.html>>, Retrieved Date: May 27, 2013, 6 pages.
(Continued)

*Primary Examiner* — Farzana B Huq

(57) ABSTRACT

Embodiments apply a set of sequenced instructions to connect to a network through a captive portal. A computing device detects a network access point and obtains the instruction set corresponding to the network access point. The instruction set is derived by a cloud service from crowdsourced data describing interactions between mobile computing devices and the network access point. Applying the instruction set includes performing actions such as navigating web pages to accept terms and conditions, provide user or device information, and more.

20 Claims, 5 Drawing Sheets

(51) Int. Cl.
*H04W 36/36* (2009.01)
*H04W 12/08* (2009.01)
*H04W 84/12* (2009.01)
*H04L 29/06* (2006.01)

(58) Field of Classification Search
CPC .............. H04L 63/0853; H04L 63/166; H04L 65/1006; H04L 65/1016; H04L 65/1069; H04L 65/1073; H04L 67/02; H04L 67/04; H04L 67/24; H04L 67/26; H04L 67/306; H04L 67/2833; H04L 67/303
USPC .................................................. 709/224–227
See application file for complete search history.

(56) References Cited

U.S. PATENT DOCUMENTS

| | | | |
|---|---|---|---|
| 6,801,777 | B2 | 10/2004 | Rusch |
| 6,993,584 | B2 | 1/2006 | Border et al. |
| 7,330,486 | B2 | 2/2008 | Ko et al. |
| 7,472,200 | B1 | 12/2008 | Taylor et al. |
| 7,821,985 | B2 | 10/2010 | Van Megen et al. |
| 7,843,843 | B1 | 11/2010 | Pap et al. |
| 7,970,931 | B2 | 6/2011 | Ventakaramaiah et al. |
| 7,974,714 | B2 | 7/2011 | Hoffberg |
| 7,979,577 | B2 | 7/2011 | Taylor et al. |
| 7,986,935 | B1 | 7/2011 | D'Souza et al. |
| 8,078,753 | B2 | 12/2011 | Bachmann et al. |
| 8,126,963 | B1 | 2/2012 | Rimmer |
| 8,174,994 | B2 | 5/2012 | Forssell et al. |
| 8,271,655 | B2 | 9/2012 | Dawson et al. |
| 8,347,355 | B2 | 1/2013 | Mower et al. |
| 8,355,337 | B2 | 1/2013 | Raleigh |
| 8,407,721 | B2 | 3/2013 | Dyba et al. |
| 8,514,828 | B1 | 8/2013 | Verma et al. |
| 8,537,715 | B1 | 9/2013 | Vadivelu |
| 8,560,504 | B2 | 10/2013 | Parker et al. |
| 8,683,193 | B1 | 3/2014 | Hansen |
| 8,687,547 | B2 | 4/2014 | Collingrige |
| 8,966,407 | B2 | 2/2015 | Shacham et al. |
| 9,369,342 | B2 | 6/2016 | Dyba et al. |
| 10,171,304 | B2 | 1/2019 | Lepp et al. |
| 10,212,210 | B2 | 2/2019 | Cho et al. |
| 2002/0057678 | A1 | 5/2002 | Jiang et al. |
| 2003/0061512 | A1 | 3/2003 | Flurry et al. |
| 2003/0065816 | A1 | 4/2003 | Dharmadhikari et al. |
| 2003/0087629 | A1 | 5/2003 | Juitt et al. |
| 2003/0100269 | A1 | 5/2003 | Lehtinen et al. |
| 2003/0140256 | A1 | 7/2003 | Hauenstein et al. |
| 2003/0177121 | A1 | 9/2003 | Moona et al. |
| 2003/0204635 | A1 | 10/2003 | Ko et al. |
| 2003/0212800 | A1 | 11/2003 | Jones et al. |
| 2004/0009751 | A1 | 1/2004 | Michaelis et al. |
| 2005/0265321 | A1 | 12/2005 | Rappaport et al. |
| 2005/0268244 | A1 | 12/2005 | Vignet |
| 2006/0205420 | A1 | 9/2006 | Bibr et al. |
| 2006/0274750 | A1 | 12/2006 | Babbar et al. |
| 2006/0277275 | A1 | 12/2006 | Glaenzer |
| 2007/0004394 | A1 | 1/2007 | Chu et al. |
| 2007/0030120 | A1 | 2/2007 | Gusse et al. |
| 2007/0030855 | A1 | 2/2007 | Ribiere et al. |
| 2007/0061482 | A1 | 3/2007 | Higuchi |
| 2007/0066304 | A1 | 3/2007 | Lee |
| 2007/0073785 | A1* | 3/2007 | Laird ................... G06F 8/71 |
| 2007/0091861 | A1 | 4/2007 | Gupta et al. |
| 2007/0112948 | A1 | 5/2007 | Uhlik |
| 2007/0167174 | A1 | 7/2007 | Halcrow et al. |
| 2007/0190977 | A1 | 8/2007 | Fok et al. |
| 2007/0211690 | A1 | 9/2007 | van megen et al. |
| 2007/0233860 | A1 | 10/2007 | Lillie et al. |
| 2008/0010198 | A1 | 1/2008 | Eliscu |
| 2008/0049649 | A1 | 2/2008 | Kozisek et al. |
| 2008/0065762 | A1 | 3/2008 | Nauerz et al. |
| 2008/0076385 | A1 | 3/2008 | Mayer et al. |
| 2008/0080413 | A1 | 4/2008 | Cole et al. |
| 2008/0080419 | A1 | 4/2008 | Cole |
| 2008/0080457 | A1 | 4/2008 | Cole |
| 2008/0080458 | A1 | 4/2008 | Cole |
| 2008/0104207 | A1 | 5/2008 | Pulkkinen et al. |
| 2008/0165683 | A1 | 7/2008 | Saha et al. |
| 2008/0176583 | A1 | 7/2008 | Brachet et al. |
| 2008/0186882 | A1 | 8/2008 | Scherzer et al. |
| 2008/0192681 | A1 | 8/2008 | Lee et al. |
| 2008/0209537 | A1 | 8/2008 | Wong et al. |
| 2008/0244451 | A1 | 10/2008 | Goering et al. |
| 2009/0031255 | A1 | 1/2009 | Kidd |
| 2009/0047970 | A1 | 2/2009 | Kim et al. |
| 2009/0061870 | A1 | 3/2009 | Finkelstein et al. |
| 2009/0069018 | A1 | 3/2009 | Babbar |
| 2009/0313318 | A1 | 12/2009 | Dye et al. |
| 2009/0313358 | A1 | 12/2009 | Shepherd et al. |
| 2010/0070256 | A1 | 3/2010 | Nilsson et al. |
| 2010/0100725 | A1 | 4/2010 | Ozzie et al. |
| 2010/0106572 | A1 | 4/2010 | van hoff et al. |
| 2010/0115415 | A1 | 5/2010 | Hickey |
| 2010/0161710 | A1 | 6/2010 | Stoner et al. |
| 2010/0184440 | A1 | 7/2010 | Mao et al. |
| 2010/0211638 | A1 | 8/2010 | Rougier |
| 2010/0272081 | A1* | 10/2010 | Laroia ................. H04W 72/042 370/338 |
| 2010/0287229 | A1 | 11/2010 | Hauser |
| 2010/0302958 | A1 | 12/2010 | Wietfeldt et al. |
| 2011/0019566 | A1 | 1/2011 | Leemet et al. |
| 2011/0078781 | A1 | 3/2011 | Chou et al. |
| 2011/0087982 | A1 | 4/2011 | Mccann et al. |
| 2011/0119386 | A1* | 5/2011 | Murrett ............... H04L 65/1069 709/227 |
| 2011/0197237 | A1 | 8/2011 | Turner |
| 2011/0244826 | A1 | 10/2011 | Krishnan et al. |
| 2011/0264812 | A1 | 10/2011 | Bergman et al. |
| 2011/0286437 | A1 | 11/2011 | Austin et al. |
| 2011/0302643 | A1 | 12/2011 | Pichna et al. |
| 2012/0030345 | A1 | 2/2012 | Mahadevan et al. |
| 2012/0066050 | A1 | 3/2012 | Satyavolu et al. |
| 2012/0113813 | A1* | 5/2012 | Haverinen .......... H04L 12/2697 370/241 |
| 2012/0113837 | A1 | 5/2012 | Siomina et al. |
| 2012/0166604 | A1 | 6/2012 | Fortier et al. |
| 2012/0167185 | A1 | 6/2012 | Menezes et al. |
| 2012/0170513 | A1 | 7/2012 | Vogedes et al. |
| 2012/0196644 | A1 | 8/2012 | Scherzer et al. |
| 2012/0209839 | A1 | 8/2012 | Andrews et al. |
| 2012/0209879 | A1* | 8/2012 | Banerjee .......... G06F 17/30696 707/776 |
| 2012/0210011 | A1 | 8/2012 | Liu et al. |
| 2012/0221955 | A1 | 8/2012 | Raleigh et al. |
| 2012/0246553 | A1 | 9/2012 | Ong |
| 2012/0276867 | A1 | 11/2012 | Mcnamee et al. |
| 2012/0278431 | A1 | 11/2012 | Luna |
| 2012/0297055 | A9 | 11/2012 | Raleigh |
| 2012/0297190 | A1 | 11/2012 | Shen et al. |
| 2012/0303823 | A1 | 11/2012 | Nair et al. |
| 2013/0007858 | A1 | 1/2013 | Shah et al. |
| 2013/0019013 | A1 | 1/2013 | Rice et al. |
| 2013/0023216 | A1 | 1/2013 | Moscibroda et al. |
| 2013/0058274 | A1 | 3/2013 | Scherzer et al. |
| 2013/0060653 | A1 | 3/2013 | Sharkey |
| 2013/0080348 | A1 | 3/2013 | Pantaliano et al. |
| 2013/0086211 | A1 | 4/2013 | Sondhi et al. |
| 2013/0103836 | A1 | 4/2013 | Baniqued et al. |
| 2013/0111024 | A1 | 5/2013 | Setia et al. |
| 2013/0115945 | A1 | 5/2013 | Holostov et al. |
| 2013/0124712 | A1 | 5/2013 | Parker |
| 2013/0128815 | A1* | 5/2013 | Scherzer ............... H04W 84/18 370/328 |
| 2013/0155876 | A1 | 6/2013 | Potra et al. |
| 2013/0217361 | A1 | 8/2013 | Mohammed et al. |
| 2013/0223308 | A1 | 8/2013 | Chandra et al. |
| 2013/0254779 | A1 | 9/2013 | Dyba et al. |
| 2013/0268632 | A1 | 10/2013 | Baron et al. |
| 2013/0268666 | A1 | 10/2013 | Wilson et al. |
| 2013/0298209 | A1 | 11/2013 | Targali et al. |
| 2013/0331082 | A1 | 12/2013 | Topaltzas et al. |
| 2014/0022918 | A1 | 1/2014 | Guo et al. |

(56) References Cited

U.S. PATENT DOCUMENTS

| | | | |
|---|---|---|---|
| 2014/0029471 A1* | 1/2014 | Tavildar | H04W 48/16 370/255 |
| 2014/0068030 A1* | 3/2014 | Chambers | H04L 41/0809 709/220 |
| 2014/0071895 A1 | 3/2014 | Bane et al. | |
| 2014/0071967 A1* | 3/2014 | Velasco | H04L 12/1403 370/338 |
| 2014/0075567 A1 | 3/2014 | Raleigh et al. | |
| 2014/0101447 A1 | 4/2014 | Lekies et al. | |
| 2014/0122695 A1 | 5/2014 | Kulikov et al. | |
| 2014/0140213 A1 | 5/2014 | Raleigh et al. | |
| 2014/0189808 A1 | 7/2014 | Mahaffey et al. | |
| 2014/0195654 A1* | 7/2014 | Kiukkonen | H04W 8/00 709/220 |
| 2014/0219155 A1 | 8/2014 | Breuer et al. | |
| 2014/0274113 A1 | 9/2014 | Teed-gillen et al. | |
| 2014/0280737 A1* | 9/2014 | Bicket | H04L 67/02 709/218 |
| 2014/0344890 A1 | 11/2014 | Warrick et al. | |
| 2015/0026773 A1 | 1/2015 | Dunphey et al. | |
| 2015/0049630 A1 | 2/2015 | Kritt et al. | |
| 2015/0052192 A1 | 2/2015 | Chauhan | |
| 2015/0089592 A1 | 3/2015 | Han et al. | |
| 2015/0089617 A1 | 3/2015 | Sondhi et al. | |
| 2015/0139074 A1 | 5/2015 | Bane et al. | |
| 2015/0142590 A1 | 5/2015 | Gray et al. | |
| 2015/0142947 A1 | 5/2015 | Dyba et al. | |
| 2015/0170072 A1 | 6/2015 | Grant et al. | |
| 2015/0188949 A1 | 7/2015 | Mahaffey et al. | |
| 2015/0237002 A1 | 8/2015 | Baniqued et al. | |
| 2016/0021097 A1 | 1/2016 | Shrotri | |
| 2016/0034673 A1 | 2/2016 | Chandra | |
| 2016/0295428 A1 | 10/2016 | Dyba et al. | |
| 2017/0094698 A1 | 3/2017 | Banks et al. | |
| 2017/0126649 A1 | 5/2017 | Votaw et al. | |
| 2018/0239885 A1 | 8/2018 | Kumar et al. | |
| 2018/0242032 A1 | 8/2018 | Viswanathan | |

FOREIGN PATENT DOCUMENTS

| | | |
|---|---|---|
| CN | 100489827 C | 5/2009 |
| CN | 101675640 A | 3/2010 |
| CN | 103281753 A | 9/2013 |
| CN | 103392319 A | 11/2013 |
| EP | 1705869 B1 | 10/2010 |
| EP | 1872609 B1 | 3/2012 |
| WO | 2006059369 A1 | 6/2006 |
| WO | 2013095451 A1 | 6/2013 |

OTHER PUBLICATIONS

Reardon, Marguerite, "Ending the headaches of Wi-Fi", Retrieved at <<http://news.cnet.com/8301-1035_3-57586189-94/ending-the-headaches-of-wi-fi/>>, May 28, 2013, CNET News, 5 pages.

Bhatt, et al., "Protect online facilities using User Authentication depend on Cloud", Retrieved at <<http://ijeit.com/vol%201/Issue%202/IJEIT1412201202_06.pdf>>, International Journal of Engineering and Innovative Technology (IJEIT), vol. 1, Issue 2, Feb. 2012, 4 pages.

"Login Assistant", Retrieved at <<www.loginassistant.net>>, Retrieved date: Jul. 30, 2013, 3 pages.

"Cloud Services provide Wi-Fi access for restaurants and retail", Retrieved at <<http://news.thomasnet.com/fullstory/Cloud-Services-provide-Wi-Fi-access-for-restaurants-and-retail-608176>>, Jan. 18, 2012, 4 pages.

"Meraki for Service Providers: Captive Portal Configuration", Retrieved at <<http://www.meraki.com/lib/pdf/meraki_whitepaper_captive.portal.pdf>>, Meraki Solution Guide: Captive Portal Configuration, Jul. 2012, 13 pages.

"AirTight Launches Social Wi-Fi; Integration of Social Channels & Customized Captive Portals Merges Social & In-Store Engagement", Retrieved at <<http://www.marketwatch.com/story/airtight-launches-social-wi-fi-integration-of-social-channels-customized-captive-portals-merges-social-in-store-engagement-2013-04-29>>, Apr. 29, 2013, 4 pages.

"Solving the Guest access, device on boarding and Security Challenges of BYOD", Retrieved at <<http://www.xirrus.com/Products/Network-Services/Access-Manager>>, Jan. 15, 2013, 2 pages.

U.S. Appl. No. 14/081,206, "Generating Sequenced Instructions for Connecting Through Captive Portals", filed Nov. 15, 2013, 37 pages.

U.S. Appl. No. 14/081,210, "Context-Based Selection of Instruction Sets for Connecting Through Captive Portals", filed Nov. 15, 2013, 31 pages.

"International Search Report and Written Opinion Issued in PCT Patent Application No. PCT/US2014/065582", dated Mar. 17, 2015, 13 Pages.

Castignani, et al., "Wi2Me: A Mobile Sensing Platform for Wireless Heterogeneous Networks", in IEEE 32nd International Conference on Distributed Computing Systems Workshops, Jun. 18, 2012, pp. 108-113.

"What is Fon?", Fon Press Notes, Jan. 30, 2014, 3 pages, Available at: https://corp.fon.com/en/media/press-notes?field_date_value%5D%5Byear%5D&field_note_type_tid=All&=Apply.

"About Challenge Based Auth (Captive Portal)", Retrieved From: https://portal.threatpulse.com/docs/am/AccessMethods/Concepts/AuthDetail/about_captport_co.htm, May 21, 2013, 3 Pages.

"Alcatel-Lucent OmniAccess Guest Manager, Easy, Scalable and Secure Guest Access", Retrieved From: http://www.alcatel-lucent.de/enterprise/ipush/ipush120/OmniAccess-Guest-Manager_DS_EN.pdf, Dec. 31, 2012, 4 pages.

"Machine Learning", Retrieved From: https://en.wikipedia.org/wiki/Machine_learning, Retrieved Date: Sep. 19, 2013, 9 Pages.

"The Best Data Usage Tracker for Android", Retrieved From: http://lifehacker.com/5916784/the-best-data-usage-tracker-for-android, Jun. 10, 2012, 6 Pages.

"Final Office Action Issued in U.S. Appl. No. 12/333,331", dated Sep. 27, 2012, 7 Pages.

"Non Final Office Action Issued in U.S. Appl. No. 12/333,331", dated Mar. 30, 2012, 18 pages.

"Final Office Action Issued in U.S. Appl. No. 14/081,184", dated Oct. 24, 2016, 14 pages.

"Non Final Office Action Issued in U.S. Appl. No. 14/081,184", dated Mar. 3, 2017, 13 Pages.

"Non Final Office Action Issued in U.S. Appl. No. 14/081,184", dated Apr. 1, 2016, 12 Pages.

"Final Office Action Issued in U.S. Appl. No. 14/081,196", dated Jan. 24, 2018, 27 Pages.

"Final Office Action Issued in U.S. Appl. No. 14/081,196", dated Apr. 18, 2016, 21 Pages.

"Final Office Action Issued in U.S. Appl. No. 14/081,196", dated Dec. 12, 2016, 24 Pages.

"Non Final Office Action Issued in U.S. Appl. No. 14/081,196", dated Jul. 30, 2018, 23 Pages.

"Non Final Office Action Issued in U.S. Appl. No. 14/081,196", dated Aug. 7, 2017, 24 Pages.

"Non Final Office Action Issued in U.S. Appl. No. 14/081,196", dated Jul. 28, 2016, 22 Pages.

"Non Final Office Action Issued in U.S. Appl. No. 14/081,196", dated Nov. 19, 2015, 17 Pages.

"Final Office Action Issued in U.S. Appl. No. 14/081,199", dated Jan. 6, 2016, 27 Pages.

"Non Final Office Action Issued in U.S. Appl. No. 14/081,199", dated Jul. 10, 2015, 22 Pages.

"Non Final Office Action Issued in U.S. Appl. No. 14/081,206", dated Mar. 25, 2016, 13 Pages.

"Non Final Office Action Issued in U.S. Appl. No. 14/081,206", dated Sep. 16, 2015, 10 Pages.

"Final Office Action Issued in U.S. Appl. No. 14/081,210", dated Jun. 3, 2016, 23 Pages.

"Final Office Action Issued in U.S. Appl. No. 14/081,210", dated Nov. 3, 2017, 18 Pages.

"Non Final Office Action Issued in U.S. Appl. No. 14/081,210", dated Oct. 23, 2015, 18 Pages.

(56) References Cited

OTHER PUBLICATIONS

"Non Final Office Action Issued in U.S. Appl. No. 14/081,210", dated Feb. 9, 2017, 19 Pages.
"Non Final Office Action Issued in U.S. Appl. No. 14/081,214", dated Jan. 26, 2015, 16 Pages.
"Non Final Office Action Issued in U.S. Appl. No. 14/081,214", dated May 11, 2015, 17 Pages.
"Search Report Issued in European Patent Application No. 14815975.9", dated Sep. 29, 2016, 5 Pages.
"Final Office Action Issued in U.S. Appl. No. 15/177,207", dated Feb. 15, 2017, 18 Pages.
"Non Final Office Action Issued in U.S. Appl. No. 15/177,207", dated Oct. 14, 2016, 20 Pages.
"Non Final Office Action Issued in U.S. Appl. No. 15/177,207", dated Nov. 14, 2017, 17 Pages.
"Non Final Office Action Issued in U.S. Appl. No. 15/177,207", dated Oct. 1, 2018, 20 Pages.
"Non Final Office Action Issued in U.S. Appl. No. 15/372,389", dated Feb. 27, 2018, 13 Pages.
"First Office Action and Search Report Issued in Chinese Patent Application No. 201480062545.3", dated Aug. 14, 2018, 16 Pages.
"First Office Action and Search Report Issued in Chinese Patent Application No. 201480062626.3", dated Jul. 4, 2018, 14 Pages.
Bode, Karl, "Verizon Wireless Plans Turbo Boost Broadband Get Bumped to the Head of the Congestion Line—for a Fee", Retrieved From: http://www.dslreports.com/shownews/Verizon-Wireless-Plans-Turbo-Boost-Broadband-116879, Retrieved Date: Apr. 11, 2013, 11 Pages.
Bojovic, et al., "A Supervised Learning Approach to Cognitive Access Point Selection", In Proceedings of the Workshop on Global Communications Conference, Dec. 5, 2011, pp. 1100-1105.
Chen, Brian X.., "Ratemizer App Offers Instant Phone-Bill Analysis", Retrieved From: http://bits.blogs.nytimes.com/2012/11/20/ratemizer-iphone-app-savings/, Jan. 16, 2013, 5 Pages.
"International Search Report & Written Opinion for PCT Application No. PCT/US2014/065580", dated Jun. 11, 2015, 15 Pages.
"International Preliminary Report on Patentability Issued in PCT Application No. PCT/US2014/065581", dated Jan. 26, 2016, 9 Pages.
"International Search Report and Written Opinions Issued in PCT Application No. PCT/US2014/068683", dated Mar. 25, 2015, 11 Pages.
"Second Written Opinion Issued in PCT Application No. PCT/US2014/065581", dated Oct. 1, 2015, 8 Pages.
"International Search Report & Written Opinion for PCT Application No. PCT/US2014/065583", dated Apr. 9, 2015, 11 Pages.
"International Search Report and Written Opinions Issued in PCT Application No. PCT/US2014/065584", dated Feb. 26, 2015, 11 Pages.
"International Search Report & Written Opinion Received for PCT Patent Application No. PCT/US2014/065585", dated Mar. 6, 2015, 9 Pages.
Schwartz, Joe, "Bing Maps Tile System", Retrieved From: http://msdn.microsoft.com/en-us/library/bb259689.aspx, Retrieved Date: Jun. 3, 2013, 10 Pages.
Sun, et al., "Towards Connectivity Management Adaptability: Context Awareness in Policy Representation and End-to-end Evaluation Algorithm", In Proceedings of the 3rd International Conference on Mobile and Ubiquitous Multimedia, Oct. 27, 2004, 8 Pages.
Venkitaraman, et al., "Session Aware Network Controlled Interface Selection for Multi-Homed Hosts", In Proceedings of WCNC IEEE Communications Society, vol. 4, Mar. 21, 2004, pp. 1963-1968.
Ylitalo, et al., "Dynamic Network Interface Selection in Multihomed Mobile Hosts", In Proceedings of the 36th Hawaii International Conference on System Sciences, Jan. 6, 2003, 10 Pages.
"Final Office Action Issued in U.S. Appl. No. 15/177,207", dated Apr. 24, 2018, 19 Pages.
"Final Office Action Issued in U.S. Appl. No. 14/081,196", dated Jan. 22, 2019, 31 Pages.
"Non Final Office Action Issued in U.S. Appl. No. 15/372,389", dated Jan. 2, 2019, 12 Pages.
"Final Office Action Issued in U.S. Appl. No. 15/177,207", dated Feb. 27, 2019, 21 Pages.
"Second Office Action Issued in Chinese Patent Application No. 201480062545.3", dated Mar. 13, 2019, 12 Pages.
"Third Office Action Issued in Chinese Patent Application No. 201480062545.3", dated Jun. 20, 2019, 8 Pages.

* cited by examiner

APPLYING SEQUENCED INSTRUCTIONS TO CONNECT THROUGH CAPTIVE PORTALS

CROSS-REFERENCE TO RELATED APPLICATIONS

This application is related to a U.S. Patent Application entitled "Generating Sequenced Instructions for Connecting Through Captive Portals," and a U.S. Patent Application entitled "Context-Based Selection of Instruction Sets for Connecting Through Captive Portals," which are both incorporated by reference herein in their entireties.

BACKGROUND

The availability of network access points, such as wireless fidelity (Wi-Fi) hotspots, has increased significantly. Many of these access points are gated and require user intervention for connection to the Internet or other networks. For example, the user may be required to accept terms and conditions, provide an email address or hotel room number, etc. Some existing solutions attempt to help the users connect to networks, such as by managing multiple passwords with a single authentication personal identification number (PIN). Some other existing solutions attempt to locate Wi-Fi hotspots near the user. However, these solutions lack a seamless auto-connect experience and fail to leverage understanding gained from connection attempts by other users.

SUMMARY

Embodiments of the disclosure automatically connect to a network through a captive portal based on crowdsourced instructions. A computing device detects a network access point. The network access point acts as a captive portal to a network. A sequenced instruction set associated with the detected network access point is requested and received from a cloud service. The sequenced instruction set is derived from crowdsourced data describing interactions between mobile computing devices and the detected network access point. The computing device applies the received sequenced instruction set to the captive portal to obtain access to the network via the network access point.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
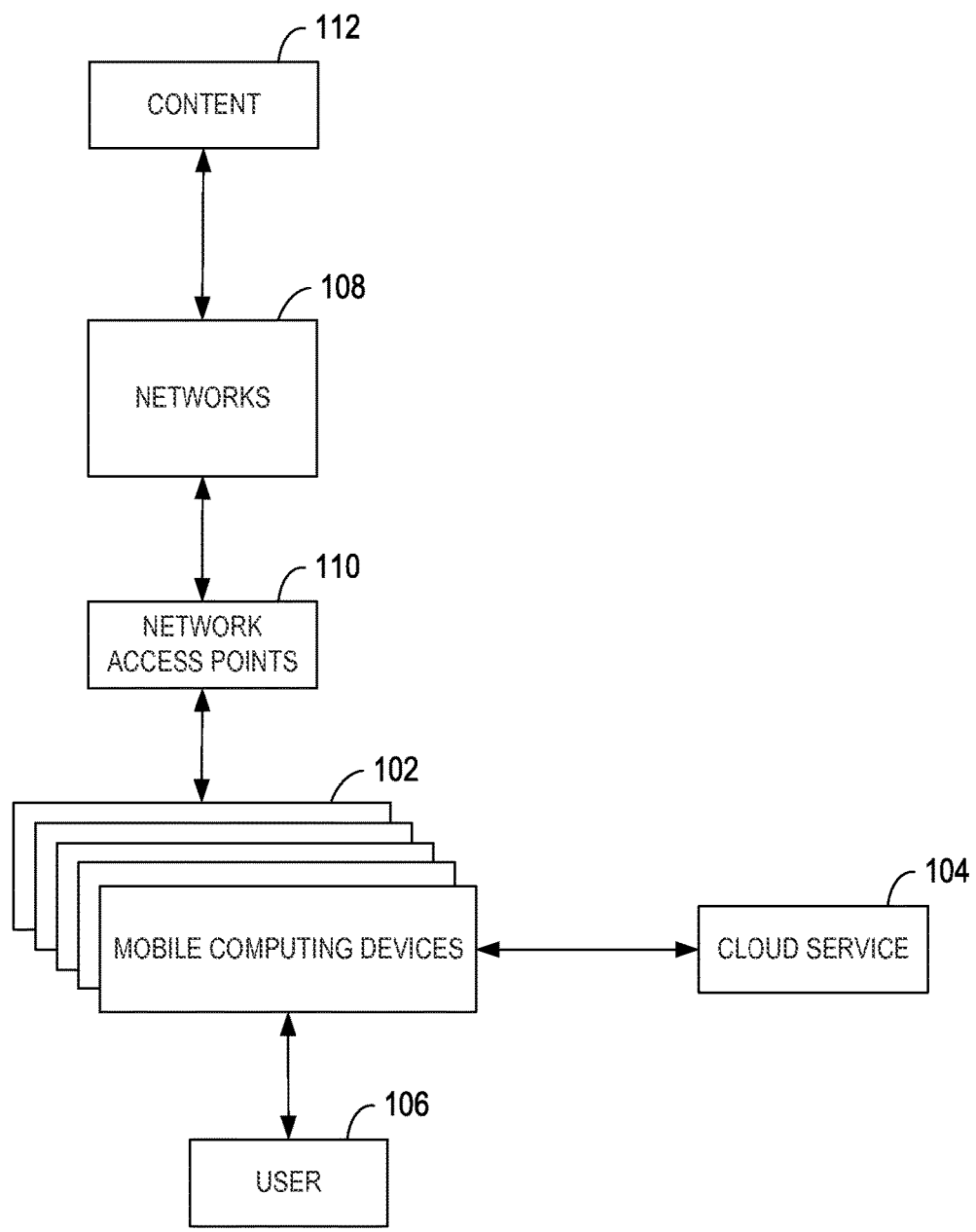
FIG. 1 is an exemplary block diagram illustrating mobile computing devices connecting to networks through network access points.

Referring to the figures, embodiments of the disclosure replay sequenced instructions 212 to connect computing devices 202 to networks 108 through network access points (NAPs) 110. In some embodiments, a cloud service 104 crowdsources data sessions (e.g., logs) to learn how users 106 typically navigate through each of the NAPs 110. For example, the cloud service 104 reconstructs a series of events that occurred to connect mobile computing devices 102 through the gated NAPs 110. The mobile computing devices 102 receive the sequenced instructions 212 from the cloud service 104 and replay the received, sequenced instructions 212 on behalf of the users 106 to connect through the NAPs 110. Aspects of the disclosure thus eliminate the challenges, friction, and tediousness encountered when attempting to connect to the networks 108 by enabling connections in an automated and seamless manner.

The gated NAPs 110 may be described as captive portals with click-through user interfaces. For example, when the user 106 of the mobile computing device 102 accesses the Internet at a hotel, the mobile computing device 102 is redirected to a captive portal web page. The captive portal web page may present advertisements, receive acceptance of terms and/or conditions of use, present confirmation screens, accept text input (e.g., shared keywords for gaining access to the networks 108), accept payment (e.g., credit card number, expiration date, etc.), and the like. The crowdsourced data sessions include, as an example, user actions, over-the-air (OTA) data such as hypertext transfer protocol (HTTP) requests and responses, device hardware context, device software context, any enterprise context, and data describing the NAPs 110.

Aspects of the disclosure adapt to changing NAPs 110 by receiving updated sets of sequenced instruction 212 from the cloud service 104 without explicit user intervention. Aspects of the disclosure further enable automatic connection to NAPs 110 without user intervention by automatically replaying the appropriate set of sequenced instructions 212 when connecting to one of the NAPs 110. While some embodiments may be described as implemented by a wireless fidelity (Wi-Fi) assist module executing on the mobile computing devices 102, aspects of the disclosure are operable with any communications protocol. For example, the mobile computing device 102 may automatically connect to a free network through a Wi-Fi hotspot by accepting default terms of service, by accepting terms of service with values inserted by scripts executing on the mobile computing device 102, by accepting terms of service with text input values (e.g., electronic mail address, telephone number, name, etc.), and/or by providing a shared key (e.g., password). In some embodiments, the mobile computing device 102 guarantees that terms of service associated with the Wi-Fi hotspot are not breached.

Referring next to FIG. 1, an exemplary block diagram illustrates the mobile computing devices 102 connecting to the networks 108 through the NAPs 110. In the example of FIG. 1, the user 106 interacts with the mobile computing device 102, or any other computing device 202 of the user 106, to access content 112 via the network 108. The mobile computing device 102 connects to one or more of the networks 108 through one or more NAPs 110, such as a Wi-Fi beacon and a cellular tower. For each NAP 110, the mobile computing device 102 may perform a series of actions to gain access, via the NAP 110, to the network 108 associated with the NAP 110. After gaining access to the network 108 through the NAP 110, the mobile computing device 102 is able to transmit and receive the content 112. In this manner, the NAP 110 acts as a captive portal.

Communication between the mobile computing device 102 and other devices may occur using any protocol or mechanism over any wired or wireless connection. For example, the mobile computing device 102 may attempt to transmit and/or receive data over a network, a cellular network, a satellite network, a whitespace network, or any network 108. In some embodiments, a NAP 110 is defined to include all NAPs 110 that share the same SSID within a particular geographic area (e.g., 100-meter radius). For example, a plurality of NAPs 110 within an airport may share the same SSID.

As described further herein, the mobile computing device 102 receives sets of sequenced instructions 212 from the cloud service 104. The sets of sequenced instructions 212 are derived from previous connection attempts to connect to the networks 108 through the NAPs 110, and generally describe the series of actions to perform to establish a connection through the NAPs 110.

Figure 2:
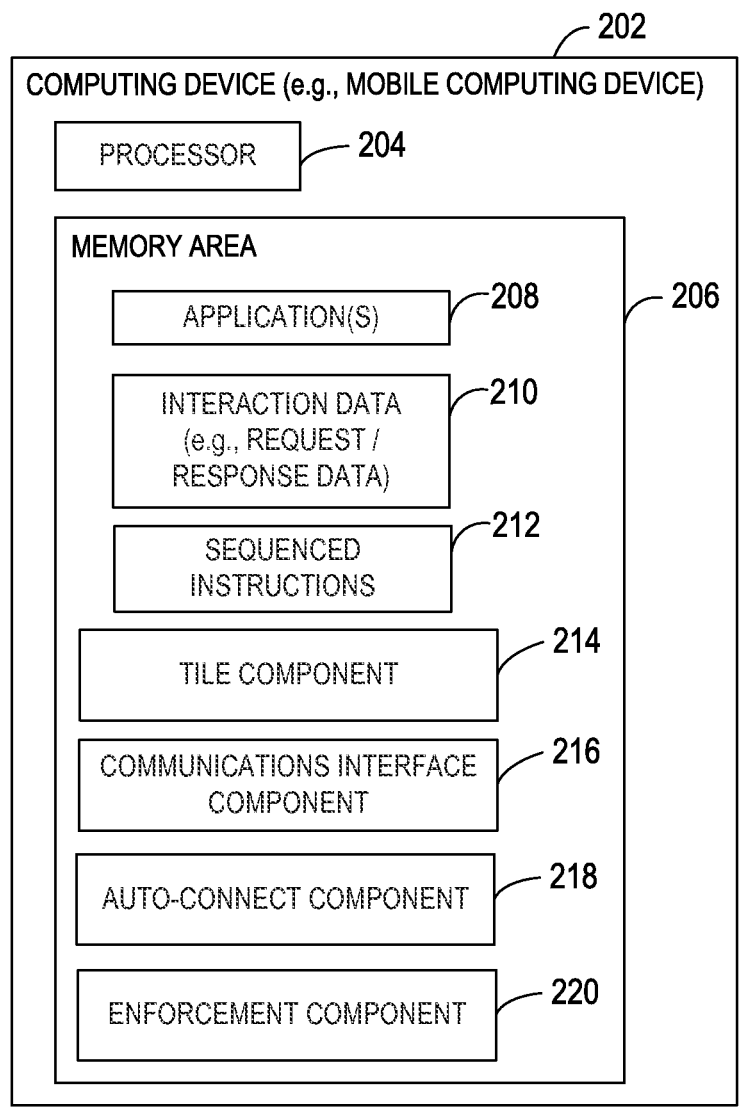
FIG. 2 is an exemplary block diagram illustrating a mobile computing device storing computer-executable components for replaying instructions to connect to networks through captive portals.

Referring next to FIG. 2, an exemplary block diagram illustrates the computing device 202 storing computer-executable components for replaying the instructions 212 to connect to networks 108 through captive portals. The computing device 202 represents any device executing instructions (e.g., as application programs, operating system functionality, or both) to implement the operations and functionality described herein. The computing device 202 may include the mobile computing device 102 or any other portable device. In some embodiments, the mobile computing device 102 includes a mobile telephone, laptop, tablet, computing pad, netbook, gaming device, and/or portable media player. The computing device 202 may also include less portable devices such as desktop personal computers, kiosks, tabletop devices, industrial control devices, wireless charging stations, and electric automobile charging stations. Additionally, the computing device 202 may represent a group of processing units or other computing devices.

In some embodiments, the computing device 202 has at least one processor 204 and a memory area 206. The processor 204 includes any quantity of processing units, and is programmed to execute computer-executable instructions for implementing aspects of the disclosure. The instructions may be performed by the processor 204 or by multiple processors executing within the computing device 202, or performed by a processor external to the computing device 202. In some embodiments, the processor 204 is programmed to execute instructions such as those illustrated in the figures (e.g., FIG. 3).

In some embodiments, the processor 204 represents an implementation of analog techniques to perform the operations described herein. For example, the operations may be performed by an analog computing device and/or a digital computing device.

The computing device 202 further has one or more computer readable media such as the memory area 206. The memory area 206 includes any quantity of media associated with or accessible by the computing device 202. The memory area 206 may be internal to the computing device 202 (as shown in FIG. 2), external to the computing device 202 (not shown), or both (not shown). In some embodiments, the memory area 206 includes read-only memory and/or memory wired into an analog computing device.

The memory area 206 stores, among other data, one or more applications 208. The applications 208, when executed by the processor 204, operate to perform functionality on the computing device 202. Exemplary applications 208 include mail application programs, web browsers, calendar application programs, address book application programs, messaging programs, media applications, location-based services, search programs, and the like. The applications 208 may communicate with counterpart applications or services such as web services accessible via the network 108. For example, the applications 208 may represent downloaded client-side applications that correspond to server-side services executing in a cloud.

The memory area 206 further stores interaction data 210. The interaction data 210 represents the interactions captured by the computing device 202 when the computing device 202 attempts to connect to the networks 108. For example, the interaction data 210 represents any set of actions, operations, procedures, or other steps undertaken when attempting to establish the connection. In some embodiments, the interaction data 210 is described as manual portal assist data.

The interaction data 210 may also represent interactions captured by other computing devices 202 and received from those computing devices 202 and/or received from the cloud service 104. In some embodiments, the interaction data 210 includes request and response data from a web browser, such as HTTP request and HTTP response data. However, the interaction data 210 may represent data in any-form or protocol. The interaction data 210 may be grouped, for example, by NAP 110, location, and/or protocol.

One or more sets of sequenced instructions 212 for connecting to the networks 108 are derived from the interaction data 210. For example, the computing device 202 transmits the captured interaction data 210 to the cloud service 104. The cloud service 104 generates the sets of sequenced instructions 212 based on the captured interaction data 210 from the computing device 202 (and from other computing devices 202), and distributes the sets of sequenced instructions 212 to one or more of the computing devices 202.

The memory area 206 further stores one or more of the sets of sequenced instructions 212 for connecting to captive portals. Each of the instruction sets is associated with at least one of the captive portals, and describes interactions between the computing device 202 and the captive portal to occur to connect through the captive portal. Each instruction set includes a chain of actions from a first request to a last request to identify the user interactions to perform to connect through the captive portal. The chain of actions include, for example, clicking on a hyperlink, executing scripts, completing a form, etc. Each instruction set is capable of being executed, applied, replayed, or otherwise processed by the computing device 202 to connect through the captive portal associated with that instruction set. In some embodiments, the instruction set includes machine-readable instructions, such as extensible markup language (XML) commands. The XML commands include a sequence of verbs for execution to connect through the NAP 110. An example structure of a set of sequenced instructions 212 is shown below:

```
<Script>
    <Operation xsi:type=Verbname>
        <Param1> Value1</Param1>
        <Param2> Value2</Param2>
    </Operation>
    <Operation xsi:type=Verbname>
        ...
    </Operation>
    ...
</Script>
```

The instruction sets may be received from the cloud service 104 or another source such as a peer computing device and/or at least one of the NAPs 110. In an example, the NAP 110 provides network access to a geographic area (e.g., to the computing devices 202 within range of the NAP 110). In this example, the cloud service 104 distributes the instruction set for the NAP 110 only to one or more of the computing devices 202 located within the geographic area. The cloud service 104 is able to identify the computing devices 202 located within a geographic area by using location services available on the computing devices 202. In another example, the cloud service 104 receives location information from a plurality of the computing devices 202. Exemplary location information includes a street address, zip code, global positioning system (GPS) coordinates, landmark information, and/or other location or position information. The cloud service 104 selects, based on the received location information, the computing devices 202 to receive the instruction set. For example, the cloud service 104 selects the computing devices 202 that have provided the location information corresponding to a location associated with the NAP 110 corresponding to the instruction set.

In some embodiments, the computing device 202 receives the sets of sequenced instructions 212 via one or more geospatial tile data structures (e.g., "tiles"). Each tile stores the sequenced instruction sets for the NAPs 110 within a particular geographic area (e.g., within one square mile). As an example, each tile stores information such as a service set identifier (SSID) and basic service set identifier (BSSID) of the NAPs 110, the locations of the NAPs 110, and the sequenced instruction sets for connecting to the networks 108 through the NAPs 110. As a further example, the tiles may store connection quality data for each of the networks 108 describing the anticipated, expected, and/or predicted experience of the applications 208 executing on the computing devices 202 when transmitting and/or receiving data over that network 108. One or more of the tiles may be downloaded (e.g., once a day) by the computing devices 202 for caching.

The memory area 206 further stores one or more computer-executable components. Exemplary components include a tile component 214, a communications interface component 216, an auto-connect component 218, and an enforcement component 220. In some embodiments, the communications interface component 216 includes a network interface card and/or computer-executable instructions (e.g., a driver) for operating the network interface card. While the communications interface component 216 is operable with short range communication technologies such as near-field communication (NFC), communication between the computing device 202 and other devices may occur using any protocol or mechanism over any wired or wireless connection.

The computing device 202 may further include at least one user interface. In some embodiments, the user interface may include a display (e.g., a touch screen display or natural user interface) and/or computer-executable instructions (e.g., a driver) for operating the display (e.g., displaying data to the user 106 and receiving data from the user 106). For example, the user interface may have a graphics card associated therewith executing the computer-executable instructions. The user interface may also include one or more of the following to provide data to the user 106 or receive data from the user 106: speakers, a sound card, a camera, a microphone, a vibration motor, one or more accelerometers, a BLUETOOTH brand communication module, GPS hardware, and a photoreceptive light sensor. For example, the user 106 may input commands or manipulate data by moving the computing device 202 in a particular way.

Operation of the components, when executed, is described below with reference to FIG. 3.

Figure 3:
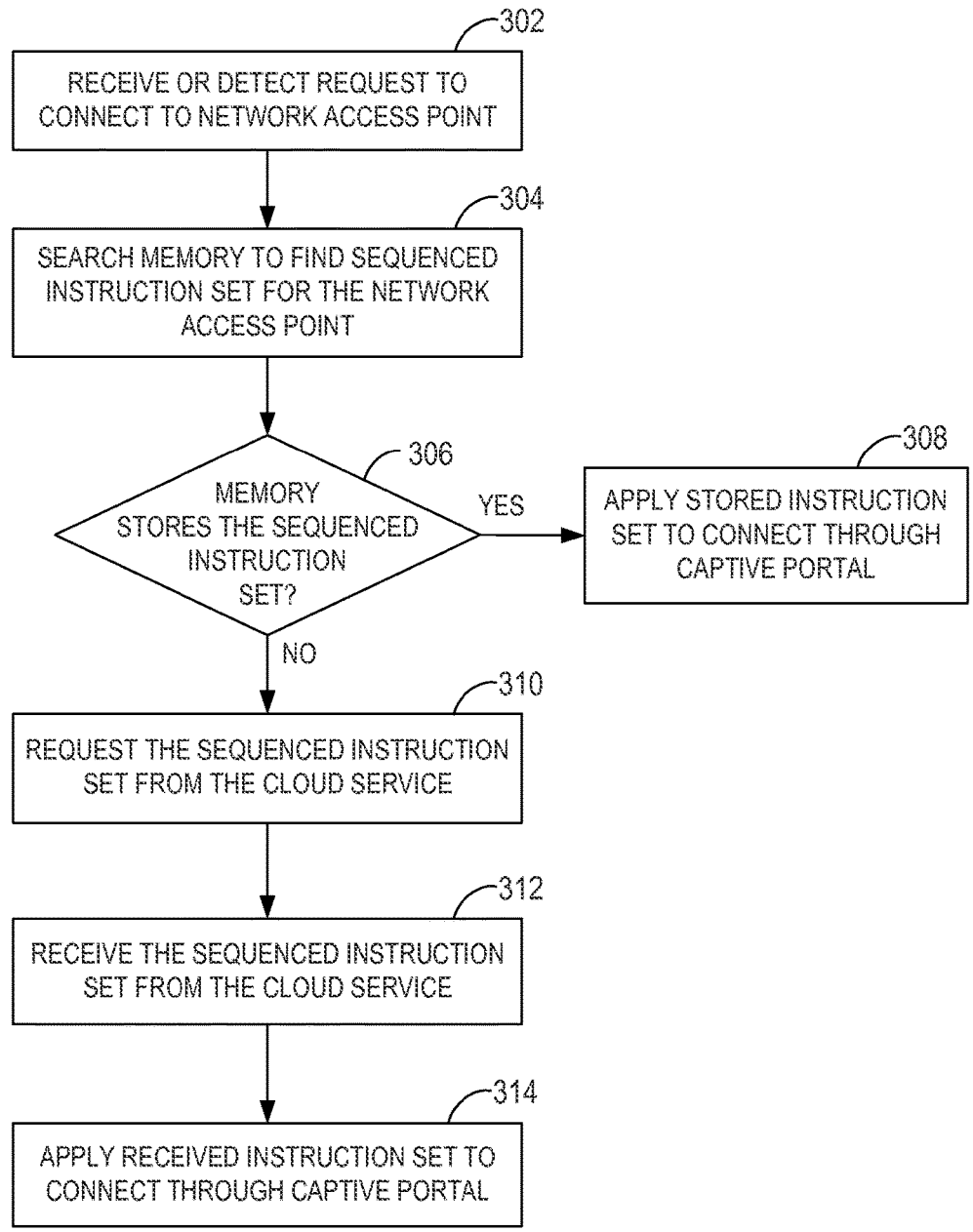
FIG. 3 is an exemplary flow chart illustrating operation of a computing device to obtain and apply an ordered set of instructions connect through a captive portal.

Referring next to FIG. 3, an exemplary flow chart illustrates operation of the computing device 202 to obtain and apply an ordered set of instructions 212 to connect through a captive portal. The operations illustrated in FIG. 3 are described with reference to execution by the computing device 202, such as the mobile computing device 102. However, aspects of the disclosure contemplate execution of the one or more of the operations by other devices or processors, such as by the cloud service 104. For example, the cloud service 104 may identify, to the computing device 202, which instruction set to apply based which NAP 110 is detected by the computing device 202. Further, while some operations are described with reference to execution of the computer-executable components embodied or otherwise stored in the memory area 206 of the computing device 202, one or more of the operations may be performed by other components or modules of the computing device 202.

At 302, the computing device 202 receives or detects a request to connect to one of the NAPs 110 acting as a captive portal. For example, one of the applications 208 executing on the computing device 202 may request to send and/or receive data over one of the networks 108. An operating system executing on the computing device 202 receives the request, such as via an application programming interface (API). As another example, the computing device 202 may detect the NAPs 110 within range of (e.g., proximate to) the computing device 202.

In some embodiments, the computing device 202 detects a plurality of the NAPs 110 and further selects one or more of the detected NAPs 110 for connection. Selecting which NAP 110 to connect through may occur, for example, based on user preference (e.g., explicit selection by the user 106 before or after NAP 110 detection), user history (e.g., whether the user 106 has previously selected or connected to the NAPs 110), input from the NAPs 110, and/or input from the computing device 202 (e.g., device manufacturer, operating system manufacturer, etc.). For example, the computing device 202 may designate one of the NAPs 110 as a preferred NAP 110 based on a configuration of the computing device 202 and/or an account of the user 106 of the computing device 202. If the computing device 202 ultimately connects to the preferred NAP 110, the user 106 may receive priority treatment such as premium content, improved bandwidth speeds, etc.

At 304, the computing device 202 searches the memory area 206 to find the set of sequenced instructions 212 corresponding to the NAP 110. For example, the computing device 202 searches the memory area 206 based on an SSID of the detected NAP 110. In some embodiments, there may be two instruction sets associated with the detected NAP 110. Each instruction set represents a different path or method for connecting through the same NAP 110. As an example, there may be a free path and a paid path. The free path represents a set of actions for obtaining access to the network 108 without paying a fee. The paid path represents a different set of action for obtaining access to the network 108 through the same NAP 110 as the free path, but by paying a fee. For example, the paid path may be taken by the users 106 who pay a monthly fee to a service provider, or who have purchased a particular amount of time on the network 108 (e.g., hourly pass, daily pass, etc.).

If the memory area 206 contains the sequenced instruction set for the NAP 110 at 306, the computing device 202 retrieves and applies the stored instruction set to connect through the captive portal at 308. If the memory area 206 does not contain the set of sequenced instructions 212, for the NAP 110 at 306, the computing device 202 requests the set of sequenced instructions 212 for the NAP 110 from the cloud service 104 at 310. The computing device 202 receives the requested instruction set from the cloud service 104 at 312. The instruction set is derived, by the cloud service 104, from data crowdsourced from a plurality of the computing devices 202. The crowdsourced data describes interactions between those computing devices 202 and the NAP 110. In some embodiments, the computing device 202 requests and receives the sequenced instruction set from a front-end web service that has access to the instruction sets generated by the cloud service 104.

At 314, the computing device 202 applies the received set of sequenced instructions 212 to the captive portal to establish a connection to the network 108 through the captive portal, or otherwise obtain access to the network 108 via the NAP 110. Applying the instruction set includes, for example, executing each of the machine-readable instructions in the instruction set. In some embodiments, the computing device 202 validates the instructions against a predefined schema. An example validation schema is shown in Appendix A.

In some embodiments, the set of instructions 212 includes one or more expressions. When applying the instruction set, the computing device 202 replaces the expressions with data particular to the computing device 202 and/or particular to the user 106. For example, the computing device 202 may insert an electronic mail address of the user 106, a telephone number of the user 106, a name of the user 106, an Internet Protocol (IP) address of the user 106, and/or a media access control (MAC) address of the computing device 202.

Aspects of the disclosure support per-instance authorization of the replacement of personal information of the user 106. For example, in some embodiments, the user 106 selectively decides what data types (e.g., email address, name, telephone number, etc.) are permitted or blocked from being replaced in the expressions. In this example, the user 106 is able to prevent a telephone number from being provided to the captive portal. In another example, the user 106 manually inputs the data (e.g., a work telephone number instead of a home telephone number) for insertion into the expressions. In these examples, the computing device 202 prompts the user 106 to confirm or otherwise authorize the replacement of the expressions with the personal data of the user 106. The user 106 selectively and/or manually provides the authorization, or inputs other data to be inserted, in response to the prompt. In this manner, the user 106 is able to prevent the release of personal information. The computing device 202 further provides the user 106 with a setting enabling the user 106 to configure authorization and/or the data to be inserted into the expressions, to be applied to all sets of instructions 212 for the user 106.

In some embodiments, the computing device 202 automatically secures the connection to the network 108 when applying the instruction set. For example, securing the connection (e.g., HTTPS data) may occur in response to one of the instructions indicating that the connection should be a secure connection. The instruction set may also indicate that authentication is needed to connect through the captive portal, and the computing device 202 may then authenticate with the NAP 110 when applying the instruction set.

After gaining access to the network 108 behind the captive portal, the computing device 202 may further collect report data, such as a telemetry event, describing the connection process. The report data details, for example, whether or not the connection was successful and whether any problems were encountered during application of the instruction set. If the connection was unsuccessful, the connection report may further indicate at which instruction 212 the connection attempt failed. An example of the collected report data is described in Appendix B.

The report data may further include performance data describing the quality of the NAP 110. The performance data may be obtained by the computing device 202 passively and/or actively. Passive operation contemplates observing communications to describe the connection, such as an amount of time the user 106 dwells on the NAP 110 (e.g., dwell time), a quantity of bytes sent and received or other transmission control protocol (TCP) statistics (e.g., upward bandwidth, downward bandwidth, retransmit rate, latency, etc.), and a disconnect reason (e.g., out of range, manual disconnect, connection failure, etc.). Active operation includes, for example, performing an active test on the network 108 (e.g., a test Voice over Internet Protocol telephone call), and then collecting statistics, such as those associated with passive operation.

The computing device 202 sends the collected report data to the cloud service 104. The cloud service 104 analyzes the report data, relating to the NAP 110, collected from each of the computing devices 202 to determine whether any changes should be made to the instruction set for the NAP 110. For example, the cloud service 104 may remove the set of sequenced instructions 212 for the NAP 110 if a success rate from the computing devices 202 falls below a pre-defined threshold. As another example, the cloud service 104 may throttle data collection (e.g., crowdsource more or less of the interaction data 210) from the computing devices 202. For example, if a success rate for one or more of the instructions falls below a pre-defined threshold (e.g., 95%), the cloud service 104 may send a command to one or more of the computing devices 202 to increase data collection for one or more of the NAPs 110 to accommodate for changes at those NAPs 110. The cloud service 104 may also send a command to decrease data collection if the cloud service 104 has enough data for a particular NAP 110. In some embodiments, the cloud service 104 sends the command by updating a flag in a geospatial tile to implement the throttling.

In some embodiments, the cloud service 104 modifies the instruction set for the NAP 110 based on the collected report data. For example, the cloud service 104 may modify a particular instruction in the set of sequenced instructions 212 to reduce the likelihood of failure at that particular instruction for subsequent attempts. The cloud service 104 makes the modified instruction set available to the computing devices 202. For example, the cloud service 104 may provide the modified instruction set to the computing device 202 in response to a request from the computing device 202, or may push or otherwise distribute the modified instruction set to the computing device 202 without first receiving a request from the computing device 202 (e.g., via the user 106 of the computing device 202).

In some embodiments, the computing device 202 identifies the NAP 110, obtains the instruction set for the NAP 110, and applies the NAP 110 automatically in response to detecting the NAP 110. For example, identifying, obtaining, and/or applying occur without explicit user input.

In some embodiments, the computer-executable component stored in the memory area 206 of the computing device 202 execute to perform one or more of the operations illustrated in FIG. 3. For example, the tile component 214, when executed by the processor 204, causes the processor 204 to receive (e.g., intermittently) sets of the sequenced instructions 212 from the cloud service 104. The communications interface component 216, when executed by the processor 204, causes the processor 204 to detect at least one of the NAPs 110 acting as a captive portal to the network 108. The auto-connect component 218, when executed by the processor 204, causes the processor 204 to automatically replay the set of sequenced instructions 212 received by the tile component 214 and corresponding to the NAP 110 detected by the communications interface component 216 to obtain access to the network 108 through the captive portal.

After establishing a connection through the captive portal, the auto-connect component 218 may further receive a single sign-on token, or other data, from the NAP 110. The auto-connect component 218 shares the single sign-on token with one or more other computing devices 202 of the user 106 (e.g., tablet, mobile telephone, gaming console, etc.). In embodiments in which the computing device 202 is a mobile telephone supporting multiple subscriber identity modules (SIMs), the auto-connect component 218 shares the single sign-on token with each of the SIMS. Alternatively or in addition, the auto-connect component 218 may implement a captive portal on the computing device 202 to gate access to the established NAP 110 connection by the other computing devices 202 of the user 106. In this manner, the other computing devices 202 of the user 106 connect to the network 108 through the computing device 202 that applied the instruction set to establish the connection.

The auto-connect component 218 may also identify and provide, to the user 106, terms of service associated with the NAP 110. The terms of service may be described by data included in the instruction set for the NAP 110, or may be obtained through other means (e.g., published by a web service). The terms of service may specify that video streaming is not allowed through the NAP 110, or that use of particular communication port numbers is prohibited. The terms of service may also specify bandwidth limitations, such as a maximum cumulative bandwidth and/or a peak bandwidth. In some embodiments, the auto-connect component 218 generates a summary of the terms of service or otherwise simplifies the terms of service. For example, the auto-connect component 218 generates an easy-to-view listing of the connected NAPs 110, popular services or applications, and whether each item in the list is allowed or not allowed. The auto-connect component 218 may also detect the applications 208 executing on the computing device 202 that are allowed to transmit through the NAP 110, and identify those applications 208 to the user 106. The summary may be derived from data associated with the set of sequenced instructions 212 received by the tile component 214 and corresponding to the NAP 110 detected by the communications interface component 216. The summary may be displayed in a user interface element (e.g., a toast or popup), via audio, and/or via a message sent through a channel such as a short message service (e.g., a text message).

The enforcement component 220, when executed by the processor 204, causes the processor 204 to selectively allow one or more of the applications 208 to transmit and/or receive data on the network 108 after a connection has been established to the network 108 (e.g., after the auto-connect component 218 obtains access). For example, the enforcement component 220 executes to enforce the terms of service associated with the NAP 110.

Figure 4:
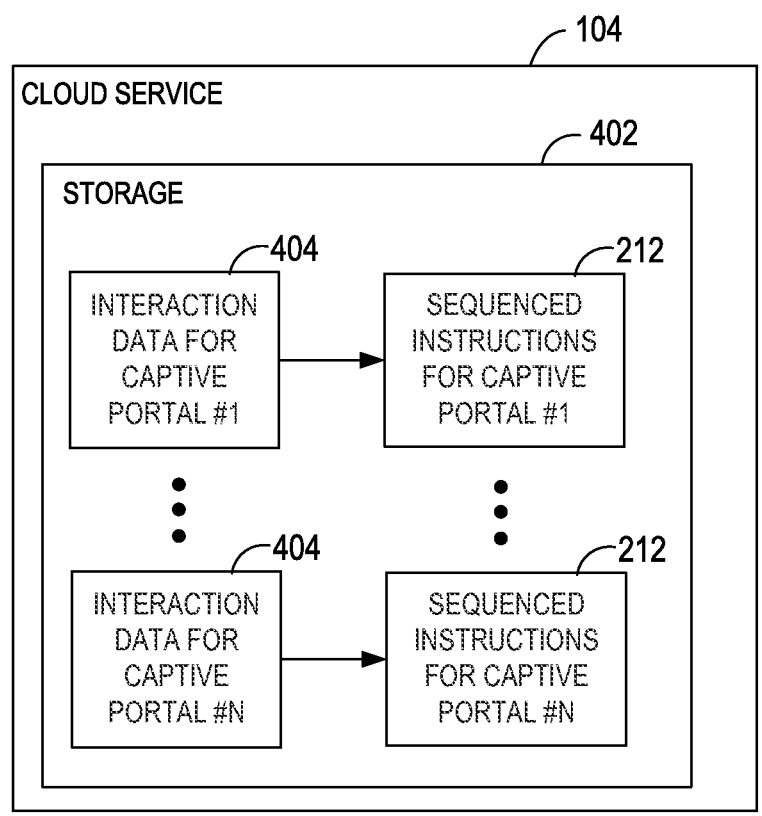
FIG. 4 is an exemplary block diagram illustrating a cloud service storing sets of sequenced instructions corresponding to captive portals.

Referring next to FIG. 4, an exemplary block diagram illustrates the cloud service 104 storing sets of sequenced instructions 212 corresponding to captive portals. In the example of FIG. 4, the cloud service 104 has storage 402 for the interaction data 404 for a plurality of the captive portals, such as for captive portal #1 through captive portal #N. The cloud service 104 generates the sequenced instructions 212 from the interaction data 404 for the captive portals. As a result, the storage 402 has correlations, associations, and/or correspondences between the interaction data 404 for each of the captive portals and the sequenced instructions 212 for that captive portal. The sequenced instructions 212 are made available to the computing devices 202 on-demand, via a push service, or any other distribution means or configuration.

Figure 5:
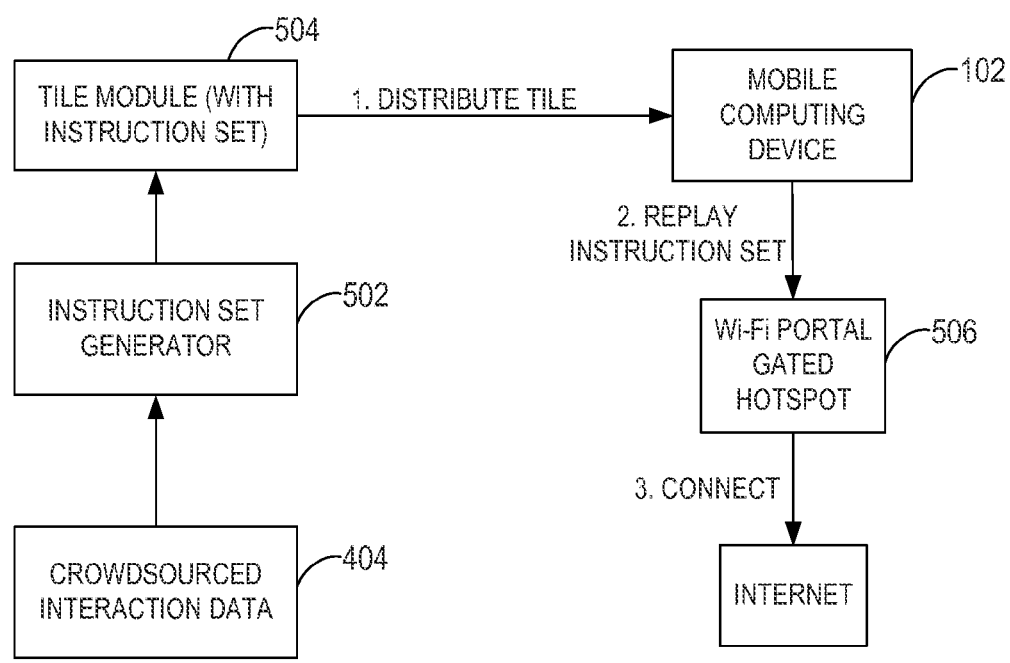
FIG. 5 is an exemplary block diagram illustrating distribution of a sequenced instruction set via a geospatial tile data structure and application of the sequenced instruction set by a mobile computing device.

Referring next to FIG. 5, an exemplary block diagram illustrates distribution of the sequenced instruction set via a geospatial tile data structure and application of the sequenced instruction set by the mobile computing device 102. While a particular sequence of operations is illustrated in FIG. 5, other sequences are within the scope of the disclosure.

In the example of FIG. 5, the interaction data 404 crowdsourced by the cloud service 104 is processed by an instruction set generator 502 to produce at least one of the sequenced instruction sets. The sequenced instruction set is distributed to the mobile computing devices 102 by, for example, able module 504. The mobile computing device 102 replays the sequenced instruction set from the tile when connecting to a Wi-Fi portal gated hotspot 506 to connect to the Internet, or other network 108.

Additional Examples

In some scenarios, the computing device 202 obtains and presents localized content associated with the NAP 110. Localized content includes, for example, advertisements, public service announcements, and the like.

An example language set for the sequenced instructions 212 is next described. Aspects of the disclosure, however, are operable with any set of verbs, operands, parameters, etc. Exemplary verbs include Probe for Connectivity (PC), Follow Redirect (FR), Follow Anchor (FA), Submit Form (SF), Navigate To (NT), and Submit Post String (SPS).

The PC verb may be the first verb in the instruction set, and probes for network connectivity by attempting to connect to a network location (e.g., a HTTP address). The FR verb follows the redirect from a previous browser page and retrieves a redirected browser page. Exemplary parameters to this verb include delay (e.g., a time delay before executing this verb), a redirect type (e.g., HttpRedirect, HtmlMetaRefresh, JavaScriptRefresh, etc.), and a timeout (e.g., a timeout for receiving a response from the web server). In XML, the FR verb may appear as shown below:

```
<Operation xsi:type="FollowRedirect">
    <Delay>0</Delay>
```

```
        <RedirectType>1</RedirectType>
        <Timeout>5000</Timeout>
    </Operation>
```

The FA verb follows an anchor from a previous page and retrieves a target page identified by the anchor. Exemplary parameters to this verb include delay (e.g., a time delay before executing this verb), an anchor identifier (e.g., a zero-based index to the anchor on the previous page), and a timeout (e.g., a timeout for receiving a response from the web server). In XML, the FA verb may appear as shown below:

```
    <Operation xsi:type="FollowAnchor">
        <Delay>0</Delay>
        <AnchorId>1</AnchorId>
        <Timeout>5000</Timeout>
    </Operation>
```

The SF verb submits a form on a previous page and retrieves the response. The SF verb looks at the action attribute in the form to identify the post uniform resource location (URL). Exemplary parameters to this verb include delay (e.g., a time delay before executing this verb), a form identifier (e.g., a zero-based index to the forms on the previous page), a submit option (e.g., a flag to indicate how to obtain contents for the post request), one or more key-value pairs (e.g., a set of key-value pairs to include in the post request), and a timeout (e.g., a timeout for receiving a response from the web server). The submit option parameter may appear as shown below:

```
    public enum FormFieldSubmitOption
    {
        None,
        UseDefaultValues,
        EmptyValues,
        OverrideValues,
        SpecifiedPairsOnly,
    }
```

Exemplary key-value pairs include one or more of the following predefined expressions which are replaced by the mobile computing device 102: % WPEmail % replaced with an email address of the user 106, WPPhone % replaced with a telephone number of the user 106, % WPFirstName % replaced with a first name of the user 106, % WPLastName % replaced with a last name of the user 106, % WPName % replaced with a complete name of the user 106, % WPIPAddress % replaced with an IP address of the mobile computing device 102, and % WPMacAddress % replaced with a media access control (MAC) address of mobile computing device 102.

In XML, the SF verb may appear as shown below:

```
    <Operation xsi:type="SubmitForm">
        <Delay>0</Delay>
        <FormId>0</FormId>
        <SubmitOption>1</SubmitOption>
        <KeyValuePairs>
            <KeyValuePair key="name" value="Anna"/>
            <KeyValuePair key="accessCode"
                value="A973BEEBD3BE78DD"/>
        </KeyValuePairs>
```

```
        <Timeout>5000</Timeout>
    </Operation>
```

The NT verb retrieves the contents of the target page. Exemplary parameters to this verb include delay (e.g., a time delay before executing this verb), address (e.g., the destination URL), and timeout (e.g., a timeout for receiving a response from the web server). The address parameter may contain one or more predefined expressions in the query string, which are replaced by the mobile computing device 102 with the respective values. In XML, the NT verb may appear as shown below:

```
    <Operation xsi:type="NavigateTo">
        <Delay>0</Delay>
        <Address>http://www...com</Address>
        <Timeout>5000</Timeout>
    </Operation>
```

The SPS verb is used to submit the specified post string to the specified address. Exemplary parameters to this verb include delay (e.g., a time delay before executing this verb), address (e.g., the destination URL), one or more key-value pairs (e.g., a set of key-value pairs to include in the post request), and a timeout (e.g., a timeout for receiving a response from the web server). The address parameter may contain one or more predefined expressions in the query string, which are replaced by the mobile computing device 102 with the respective values. In XML, the SPS verb may appear as shown below:

```
    <Operation xsi:type="SubmitPostString">
        <Delay>0</Delay>
        <Address>http://www...com</Address>
        <KeyValuePairs>
            <KeyValuePair key="name" value="Anna" />
            <KeyValuePair key="accessCode"
                value="A973BEABD3BE45ED" encrypted="true" />
        </KeyValuePairs>
        <Timeout>5000</Timeout>
    </Operation>
```

At least a portion of the functionality of the various elements in the figures may be performed by other elements in the figures, or an entity (e.g., processor, web service, server, application program, computing device, etc.) not shown in the figures.

In some embodiments, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The term "Wi-Fi" as used herein refers, in some embodiments, to a wireless local area network using high frequency radio signals for the transmission of data. The term "BLUETOOTH" as used herein refers, in some embodiments, to a wireless technology standard for exchanging data over short distances using short wavelength radio transmission. The term "NFC" as used herein refers, in some embodiments, to a short-range high frequency wireless communication technology for the exchange of data over short distances.

Embodiments have been described with reference to data monitored and/or collected from the users 106. In some embodiments, notice may be provided to the users 106 of the collection of the data (e.g., via a dialog box or preference setting) and users 106 are given the opportunity to give or deny consent for the monitoring and/or collection. The consent may take the form of opt-in consent or opt-out consent.

Further, the user 106 may opt-out of replaying the sequenced instructions 212 for particular NAPs 110. For example, the user 106 may designate the NAPs 110 by name (e.g., SSID), location (e.g., metropolitan service area, address, etc.), venue (e.g., retail store or restaurant), network, etc.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware. Exemplary computer storage media include hard disks, flash drives, and other solid-state memory. In contrast, communication media embody computer readable instructions, data structures, program modules, or other data in a modulated data signal such as a carrier wave or other transport mechanism and include any information delivery media.

Although described in connection with an exemplary computing system environment, embodiments of the disclosure are capable of implementation with numerous other general purpose or special purpose computing system environments, configurations, or devices.

Examples of well-known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user 106 in any way, including from input devices such as a keyboard or pointing device, via gesture input, proximity input (such as by hovering), and/or via voice input.

Embodiments of the invention may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for automatically connecting to one of the networks 108 through a captive portal based on crowdsourced instructions. For example, one or more of the embodiments contemplate means for detecting one of the captive portals within range of the mobile computing device 102, identifying one of the instruction sets associated with the detected captive portal, and applying the identified instruction set to the detected captive portal to obtain access to the network 108.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

APPENDIX A

An example of a validation schema for validating the sequenced instructions 212 to be applied by the computing device 202 is shown below.

```
<?xml version="1.0" encoding="utf-8"?>
<xs:schema xmlns:xs="http://www.w3.org/2001/XMLSchema">
    <xs:complexType name ="OperationType" abstract="true"/>
    <xs:complexType name="ProbeForConnectivity">
        <xs:complexContent>
            <xs:extension base="OperationType"/>
        </xs:complexContent>
    </xs:complexType>
    <xs:complexType name="FollowLink">
        <xs:complexContent>
```

```
            <xs:extension base="OperationType">
                <xs:sequence>
                    <xs:element type="xs:int" name="Delay"/>
                    <xs:element type="xs:int" name="LinkId"/>
                    <xs:element type="xs:int" name="Timeout"/>
                </xs:sequence>
            </xs:extension>
        </xs:complexContent>
    </xs:complexType>
    <xs:complexType name="SubmitForm">
        <xs:complexContent>
            <xs:extension base="OperationType">
                <xs:sequence>
                    <xs:element type="xs:int" name="Delay"/>
                    <xs:element type="xs:int" name="FormId"/>
                    <xs:element type="xs:int" name="SubmitOption"/>
                    <xs:element name="KeyValuePairs" minOccurs="0" maxOccurs="1">
                        <xs:complexType>
                            <xs:sequence>
                                <xs:element name="KeyValuePair" minOccurs="1" maxOccurs="unbounded" >
                                    <xs:complexType>
                                        <xs:attribute name="key" type="xs:string" use="required" />
                                        <xs:attribute name="value" type="xs:string" use="required" />
                                    </xs:complexType>
                                </xs:element>
                            </xs:sequence>
                        </xs:complexType>
                    </xs:element>
                    <xs:element type="xs:int" name="Timeout"/>
                </xs:sequence>
            </xs:extension>
        </xs:complexContent>
    </xs:complexType>
    <xs:complexType name="FollowRedirect">
        <xs:complexContent>
            <xs:extension base="OperationType">
                <xs:sequence>
                    <xs:element type="xs:int" name="Delay"/>
                    <xs:element type="xs:int" name="RedirectType"/>
                    <xs:element type="xs:int" name="Timeout"/>
                </xs:sequence>
            </xs:extension>
        </xs:complexContent>
    </xs:complexType>
    <xs:complexType name="NavigateTo">
        <xs:complexContent>
            <xs:extension base="OperationType">
                <xs:sequence>
                    <xs:element type="xs:int" name="Delay"/>
                    <xs:element type="xs:string" name="Address"/>
                    <xs:element type="xs:int" name="Timeout"/>
                </xs:sequence>
            </xs:extension>
        </xs:complexContent>
    </xs:complexType>
    <xs:complexType name="SubmitPostString">
        <xs:complexContent>
            <xs:extension base="OperationType">
                <xs:sequence>
                    <xs:element type="xs:int" name="Delay"/>
                    <xs:element type="xs:string" name="Address"/>
                    <xs:element name="KeyValuePairs" minOccurs="1" maxOccurs="1">
                        <xs:complexType>
                            <xs:sequence>
                                <xs:element name="KeyValuePair" minOccurs="1" maxOccurs="unbounded" >
                                    <xs:complexType>
                                        <xs:attribute name="key" type="xs:string" use="required" />
                                        <xs:attribute name="value" type="xs:string" use="required" />
                                    </xs:complexType>
                                </xs:element>
                            </xs:sequence>
                        </xs:complexType>
                    </xs:element>
                    <xs:element type="xs:int" name="Timeout"/>
                </xs:sequence>
            </xs:extension>
        </xs:complexContent>
    </xs:complexType>
    <xs:element name="Script">
        <xs:complexType>
            <xs:sequence>
                <xs:element name="Operation" type="OperationType" maxOccurs="unbounded" minOccurs="1"/>
            </xs:sequence>
        </xs:complexType>
    </xs:element>
</xs:schema>
```

APPENDIX B

An example of a telemetry event collected by the cloud service 104 from the mobile computing devices 102 is next described. The telemetry event indicates whether or not the connection attempt was successful. As shown in the example code below, after the connection attempt, the mobile computing device 102 sends the telemetry event containing, for example, the BSSID, SSID, device identifier, instruction identifiers, and a flag indicating success (e.g., "True") or failure (e.g., "False") of the connection attempt. If the connection was successful, the flag indicates success. If the connection failed yet the instructions 212 were replayed or executed properly, the flag indicates failure. If the mobile computing device 102 was unable to replay each of the instructions 212 properly, the flag indicates failure and the mobile computing device 102 updates the telemetry event to further identify which operation failed, the reason for the failure, and a session identifier.

```
/// <summary>
///  WiFi Portal Assist Telemetry Event
/// </summary>
public sealed class WFPATelemetry
{
    /// <summary>
    /// Bssid of the access point
    /// </summary>
    [DataMember (Name = "bssid")]
    public string Bssid { get; set; }
    /// <summary>
    /// Ssid of the access point
    /// </summary>
    [DataMember (Name = "ssid")]
    public string Ssid { get; set; }
    /// <summary>
    /// Device Id
    /// </summary>
    [DataMember(Name = "dvc")]
    public string DeviceId { get; set; }
    /// <summary>
    /// Instruction Id
    /// </summary>
    [DataMember(Name = "inid")]
    public int InstructionId { get; set; }
    /// <summary>
    /// Flag to indicate success
    /// </summary>
    [DataMember (Name = "succ")]
    public bool Success { get; set; }
    /// <summary>
    /// Zero based index to indicate the failed operation.
    /// </summary>
```

```
        [OptionalField]
        [DataMember (Name = "opid")]
        public int OperationIndex { get; set; }
        /// <summary>
        /// Failure reason code
        /// </summary>
        [OptionalField]
        [DataMember (Name = "reas")]
        public FailureReason reason { get; set; }
        /// <summary>
        /// WebSession
        /// </summary>
        [OptionalField]
        [DataMember(Name = "sess")]
        public IEnumerable<RequestResponsePairs> session
{ get; set; }
    }
    /// <summary>
    /// The Response structure
    /// </summary>
    public class Response
    {
        /// <summary>
        /// The response code i.e. 200, 302, 404 etc.
        /// </summary>
        [DataMember (Name = "stat")]
        public int Status { get; set; }
        /// <summary>
        /// The collection containing the header keyvalue
pairs
        /// </summary>
        [DataMember(Name = "head")]
        public IEnumerable<Header> Headers { get; set; }
        /// <summary>
        /// The Content part of the response
        /// </summary>
        [DataMember(Name = "cont")]
        public string Content { get; set; }
    }
    /// <summary>
    /// The Request structure
    /// </summary>
    public class Request
    {
        /// <summary>
        /// The http Method being used i.e. GET, POST.
        /// </summary>
        [DataMember(Name = "meth")]
        public string Method { get; set; ]
        /// <summary>
        /// The target URL
        /// </summary>
        [DataMember(Name = "url")]
        public string Url { get; set; }
        /// <summary>
        /// The Content part of the request
        /// </summary>
        [DataMember(Name = "cont")]
        public string Content { get; set; }
    }
    /// <summary>
    /// Failure Reasons
    /// </summary>
    public enum FailureReason
    {
        Unknown,
        Timeout,
        UnexpectedResponse,
        Disconnected
    }
```

What is claimed is:

1. A system for automatically connecting to a network through a captive portal based on crowdsourced instructions, said system comprising:
a memory area associated with a mobile computing device, said memory area storing a plurality of sequenced instruction sets for connecting to networks through captive portals, the plurality of sequenced instruction sets being received from a cloud service and comprising instructions used by computing devices other than the mobile computing device to connect to the networks through the captive portals, the instructions generated based at least on interactions captured when the computing devices other than the mobile computing device attempt to connect to the networks through the captive portals; and
a processor coupled to the memory area, the processor programmed to:
detect one of the captive portals within range of the mobile computing device;
identify, from the memory area, one of the plurality of sequenced instruction sets associated with the detected one of the captive portals;
automatically insert, into the identified one of the plurality of sequenced instructions sets based on the captured interactions, data particular to at least one of the mobile computing device or a user of the mobile computing device, the data including user specific information used to perform the interactions;
execute the identified one of the plurality of sequenced instruction sets with the inserted data to obtain access to the network through the detected one of the captive portals; and
receive an updated version of the sequenced instruction set from the cloud service without input from the user of the mobile computing device.

2. The system of claim 1, wherein the processor is programmed to identify the one of the plurality of sequenced instruction sets by searching the memory area based on a service set identifier (SSID) of the detected one of the captive portals.

3. The system of claim 1, wherein the identified one of the plurality of sequenced instruction sets comprises machine-readable instructions.

4. The system of claim 1, wherein the processor is programmed to apply the identified one of the plurality of sequenced instruction sets without input from the user of the mobile computing device and a user of at least one of the computing devices other than the mobile computing device being a different user than the user of the mobile computing device.

5. The system of claim 1, wherein the processor is programmed to identify the one of the plurality of sequenced instruction sets and apply the identified one of the plurality of sequenced instruction sets automatically in response to detecting the one of the captive portals.

6. The system of claim 1, wherein the processor is further programmed to establish a connection to the network through the captive portal after applying the identified one of the plurality of sequenced instruction sets, wherein the interactions comprise interaction data including manual portal assist data.

7. The system of claim 1, wherein the plurality of sequenced instruction sets describe interactions between the mobile computing device and one of the captive portals, and the interactions represent a set of actions, operations, procedures, or other steps performed when attempting to establish the connection.

8. A method comprising:
detecting, by a mobile computing device, a network access point, the network access point acting as a captive portal for connecting to a network;
requesting, from a cloud service, a sequenced instruction set associated with the detected network access point;

receiving the requested sequenced instruction set, the received sequenced instruction set comprising instructions being derived from crowdsourced data describing interactions used by computing devices other than the mobile computing device to connect to the network through the detected network access point, the instructions generated based at least on interactions captured when the computing devices other than the mobile computing device attempt to connect to the network through the captive portal;

automatically inserting within the received sequenced instruction set based on the captured interactions, data particular to at least one of the mobile computing device or a user of the mobile computing device, the data including user specific information used to perform the interactions;

applying the received sequenced instruction set with the inserted data to obtain access to the network via the detected network access point; and receiving an updated version of the sequenced instruction set from the cloud service without input from the user of the mobile computing device.

9. The method of claim 8, further comprising collecting report data describing application of the received sequenced instruction set to the captive portal.

10. The method of claim 9, further comprising sending the collected report data to the cloud service, the cloud service modifying the sequenced instruction set based on the collected report data.

11. The method of claim 8, wherein the data comprises at least one of the following: an electronic mail address of the user, a telephone number of the user, a name of the user, an Internet Protocol (IP) address of the user, or a media access control (MAC) address of the mobile computing device.

12. The method of claim 8, wherein applying the received sequenced instruction set with the inserted data comprises establishing a connection to the network, and further comprising automatically securing the connection based on instructions in the received sequenced instruction set with the inserted data.

13. The method of claim 8, wherein detecting the network access point comprises detecting a plurality of the network access points, and further comprising designating one of the plurality of network access points as a preferred network access point based on a configuration of the mobile computing device and/or an account of the user of the mobile computing device.

14. Computer memory embodying computer-executable components, said components comprising:

a tile component that when executed causes at least one processor of a mobile computing device to receive sets of sequenced instructions corresponding to at least one of a plurality of network access points and being derived from computing devices other than the mobile computing device that have used the sets of sequenced instructions to connect to the plurality of network access points;

a communications interface component that when executed causes at least one processor to detect one of the plurality of network access points, the detected network access point acting as a captive portal to a network; and an auto-connect component that when executed causes the at least one processor to automatically insert into the received set of sequenced instructions, based at least on interactions captured when the computing devices other than the mobile computing device attempt to connect to the network through the captive portal, data particular to at least one of the mobile computing device or a user of the mobile computing device, the data including user specific information used to perform the interactions, the auto-connect component further automatically executing the set of sequenced instructions with the inserted data to obtain access to the network through the captive portal, and receive an updated version of the set of sequenced instructions from a cloud service without input from the user of the mobile computing device.

15. The computer memory of claim 14, further comprising an enforcement component that when executed causes at least one processor to selectively allow, based on terms of service associated with the detected network access point, one or more applications on the mobile computing device to transmit and receive data on the network after the auto-connect component obtains the access to the network.

16. The computer memory of claim 14, wherein the mobile computing device is associated with the user, and wherein the auto-connect component further: receives a single sign-on token from the detected network access point after obtaining access to the network, and shares the received single sign-on token with another computing device of the user.

17. The computer memory of claim 14, wherein the auto-connect component further provides, to the user of the mobile computing device, a summary of terms of service associated with the detected network access point, the summary being derived from data associated with the set of sequenced instructions received by the tile component and corresponding to the network access point detected by the communications interface component.

18. The method of claim 8, wherein applying the received sequenced instruction set occurs without input from the user of the mobile computing device.

19. The computer memory of claim 14, wherein the auto-connect component automatically executes the set of sequenced instructions without input from the user.

20. The method of claim 8, further comprising providing, to the user of the mobile computing device, a summary of terms of service associated with the detected network access point, the summary being derived from data associated with the sequenced instruction set and corresponding to the network access point.

* * * * *